(12) United States Patent
Kennedy

(10) Patent No.: US 11,146,537 B1
(45) Date of Patent: Oct. 12, 2021

(54) SYSTEMS AND METHODS FOR PROTECTING GEOLOCATION INFORMATION

(71) Applicant: Symantec Corporation, Mountain View, CA (US)

(72) Inventor: Mark Kennedy, Gardena, CA (US)

(73) Assignee: NortonLifeLock Inc., Tempe, AZ (US)

( * ) Notice: Subject to any disclaimer, the term of this patent is extended or adjusted under 35 U.S.C. 154(b) by 220 days.

(21) Appl. No.: 15/846,241

(22) Filed: Dec. 19, 2017

(51) Int. Cl.
*H04L 29/06* (2006.01)

(52) U.S. Cl.
CPC ........ *H04L 63/0414* (2013.01); *H04L 63/107* (2013.01)

(58) Field of Classification Search
CPC .................................................. H04L 63/0414
USPC ............................................................ 726/30
See application file for complete search history.

(56) References Cited

U.S. PATENT DOCUMENTS

| | | | |
|---|---|---|---|
| 2005/0125673 A1* | 6/2005 | Cheng ...................... | G06F 21/32 713/182 |
| 2006/0120526 A1* | 6/2006 | Boucher ............. | G06F 21/6218 380/247 |
| 2010/0077484 A1* | 3/2010 | Paretti ................. | G06F 21/6245 726/26 |
| 2011/0035284 A1* | 2/2011 | Moshfeghi ............ | H04W 4/027 705/14.58 |
| 2013/0023306 A1* | 1/2013 | Somei ............... | H04M 1/72555 455/556.1 |
| 2013/0035063 A1* | 2/2013 | Fisk .................. | H04M 1/72572 455/410 |
| 2015/0050922 A1* | 2/2015 | Ramalingam ......... | H04W 12/08 455/418 |
| 2016/0174031 A1* | 6/2016 | Smith ................... | H04W 12/08 455/456.1 |
| 2016/0180093 A1* | 6/2016 | Goss ....................... | G06F 21/57 726/1 |
| 2018/0109936 A1* | 4/2018 | Ting ..................... | H04W 4/029 |

* cited by examiner

*Primary Examiner* — Anthony D Brown
(74) *Attorney, Agent, or Firm* — FisherBroyles, LLP

(57) ABSTRACT

The disclosed computer-implemented method for protecting geolocation information may include (i) receiving, by a computing device, a geolocation security policy that defines an area in which access to geolocation information by applications will be at least partially limited to protect the privacy of a user, (ii) detecting, by the computing device, a geolocation of the computing device, (iii) applying, by the computing device, the geolocation security policy to the detected geolocation to determine whether the detected geolocation matches the area in which access to geolocation information by the applications will be at least partially limited, and (iv) performing, by the computing device, a security action to protect the privacy of the user based on determining that the detected geolocation matches the area. Various other methods, systems, and computer-readable media are also disclosed.

20 Claims, 7 Drawing Sheets

SYSTEMS AND METHODS FOR PROTECTING GEOLOCATION INFORMATION

BACKGROUND

Geotagging is a useful feature in modern smartphones. When a user enables geotagging on a smartphone, the phone may then automatically tag captured content with information indicating the geolocation of the phone at that time as well as potentially other related information, including the time of capture. For example, a user may take a photograph with a camera of the smartphone and the smartphone may automatically tag the photograph with information indicating the time and place. Specifically, the smartphone may automatically insert this information into metadata within a header of the file of the photograph.

Despite the usefulness of geotagging, this feature can also post certain concerns about security and privacy for users. In some instances, users would prefer to keep this information private. Accordingly, in some conventional systems users may manually disable geotagging for all content using a global on/off setting. Nevertheless, these users may benefit from improved techniques that protect geolocation information in a more granular and/or dynamic manner, as discussed further below. The instant disclosure, therefore, identifies and addresses a need for improved systems and methods for protecting geolocation information.

SUMMARY

As will be described in greater detail below, the instant disclosure describes various systems and methods for protecting geolocation information. In one example, a computer-implemented method for protecting geolocation information may include (i) receiving, by a computing device, a geolocation security policy that defines an area in which access to geolocation information by applications will be at least partially limited to protect the privacy of a user, (ii) detecting, by the computing device, a geolocation of the computing device, (iii) applying, by the computing device, the geolocation security policy to the detected geolocation to determine whether the detected geolocation matches the area in which access to geolocation information by the applications will be at least partially limited, and (iv) performing, by the computing device, a security action to protect the privacy of the user based on determining that the detected geolocation matches the area, the security action including disabling an action to record the detected geolocation and/or reducing an accuracy of the detected geolocation to obscure the user's actual location.

In some examples, receiving the geolocation security policy may include receiving user input that specifies the area in which access to geolocation information by the applications will be at least partially limited. In some examples, receiving user input that specifies the area in which access to geolocation information by the applications will be at least partially limited may include receiving user input indicating an address and/or geolocation coordinates.

In some examples, receiving the geolocation security policy may include detecting an initial geolocation of the computing device that indicates the area in which access to geolocation information by the applications will be at least partially limited. In some examples, detecting the initial geolocation of the computing device may include detecting a line of geolocations that indicates a border of the area in which access to geolocation information by the applications will be at least partially limited.

In some examples, receiving the geolocation security policy may include receiving an indication of a radius around the initial geolocation that defines the area in which access to geolocation information by the applications will be at least partially limited. In one embodiment, the security action may include disabling an action to record the detected geolocation.

In one embodiment, the action to record the detected geolocation may include an action to tag an item of content with the detected geolocation. In one embodiment, the item of content was captured by a sensor of the computing device. In one embodiment, the sensor may include a camera and/or a microphone.

In one embodiment, a system for implementing the above-described method may include (i) a reception module, stored in memory of a computing device, that receives a geolocation security policy that defines an area in which access to geolocation information by applications will be at least partially limited to protect the privacy of a user, (ii) a detection module, stored in memory of the computing device, that detects a geolocation of the computing device, (iii) an application module, stored in memory of the computing device, that applies the geolocation security policy to the detected geolocation to determine whether the detected geolocation matches the area in which access to geolocation information by the applications will be at least partially limited, (iv) a performance module, stored in memory of the computing device, that performs a security action to protect the privacy of the user based on determining that the detected geolocation matches the area, the security action including disabling an action to record the detected geolocation and/or reducing an accuracy of the detected geolocation to obscure the user's actual location, and (v) at least one physical processor configured to execute the reception module, the detection module, the application module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a geolocation security policy that defines an area in which access to geolocation information by applications will be at least partially limited to protect the privacy of a user, (ii) detect a geolocation of the computing device, (iii) apply the geolocation security policy to the detected geolocation to determine whether the detected geolocation matches the area in which access to geolocation information by the applications will be at least partially limited, and (iv) perform a security action to protect the privacy of the user based on determining that the detected geolocation matches the area, the security action including disabling an action to record the detected geolocation and/or reducing an accuracy of the detected geolocation to obscure the user's actual location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Figure 1:
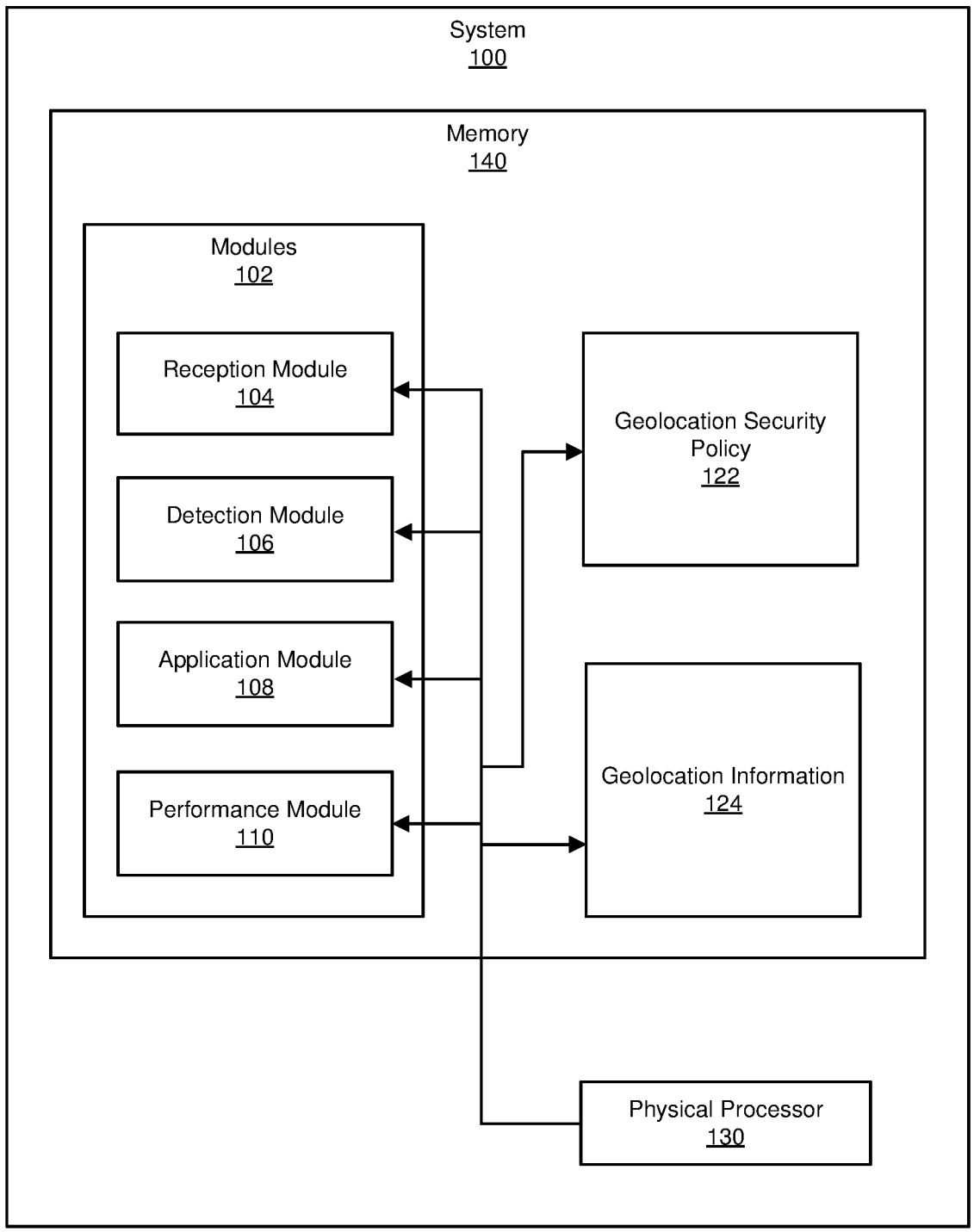
FIG. 1 is a block diagram of an example system for protecting geolocation information.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting geolocation information. The disclosed systems and methods may improve upon related techniques for protecting geolocation information. Specifically, the disclosed systems and methods may improve the granularity and/or intelligence of systems that protect geolocation information. Accordingly, the disclosed systems and methods may dynamically protect geolocation information based upon one or more factors, including a current or detected geolocation of the computing device. The disclosed systems and methods may thereby enable the user to selectively and automatically share, or protect, geolocation information without forcing the user to enable, or disable, geolocation tagging on a global basis.

Figure 2:
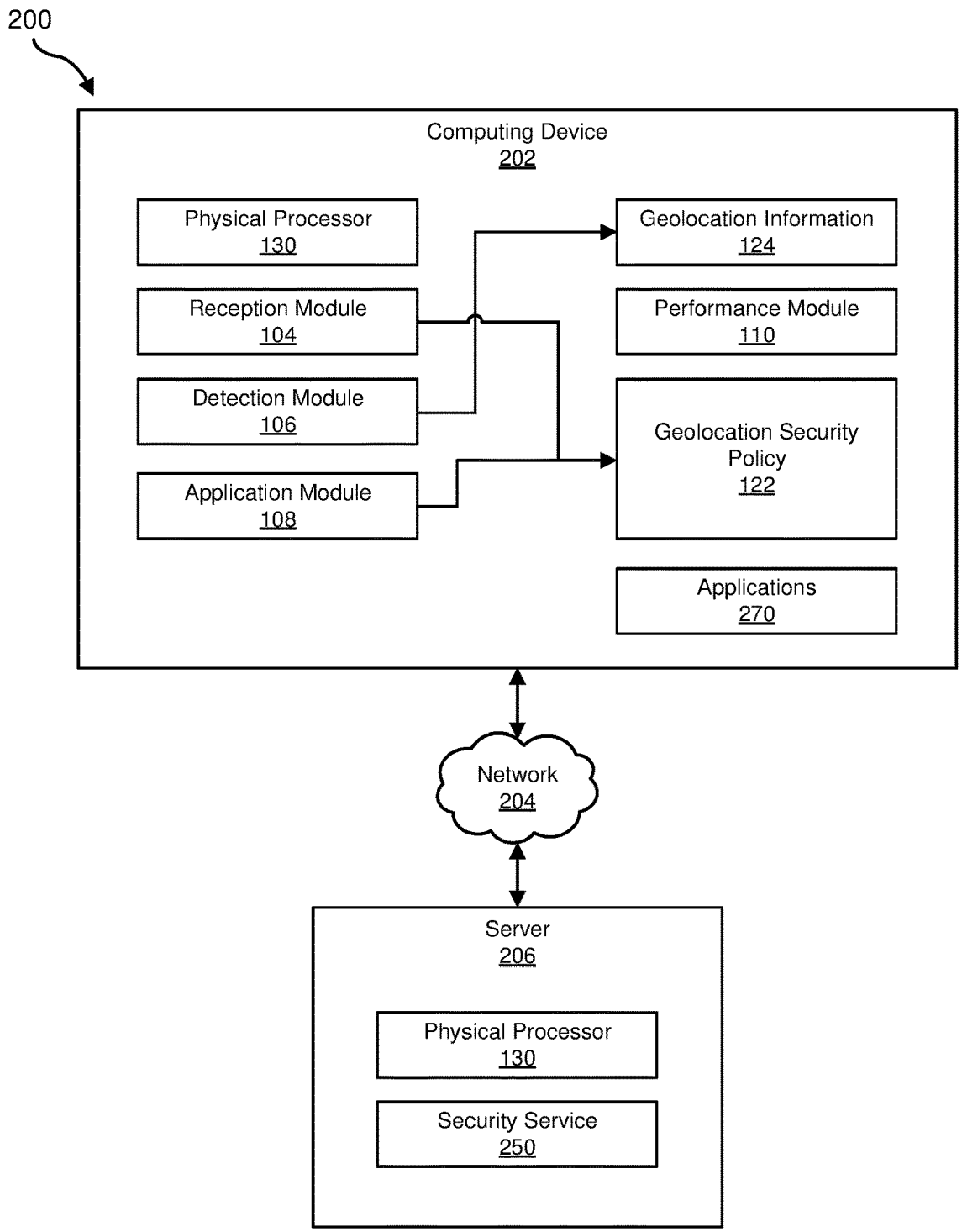
FIG. 2 is a block diagram of an additional example system for protecting geolocation information.

The following will provide, with reference to FIGS. 1 and 2, detailed descriptions of example systems for protecting geolocation information. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for protecting geolocation information. As illustrated in this figure, example system 100 may include one or more modules 102 for performing one or more tasks. For example, and as will be explained in greater detail below, example system 100 may include a reception module 104 that receives a geolocation security policy, such as a geolocation security policy 122, that defines an area in which access by applications to geolocation information, such as geolocation information 124, will be at least partially limited to protect the privacy of a user. Example system 100 may additionally include a detection module 106 that detects a geolocation of the computing device. Example system 100 may also include an application module 108 that applies geolocation security policy 122 to the detected geolocation to determine whether the detected geolocation matches the area in which access to geolocation information 124 by the applications will be at least partially limited. Example system 100 may additionally include a performance module 110 that performs a security action to protect the privacy of the user based on determining that the detected geolocation matches the area. The security action may include disabling an action to record the detected geolocation and/or reducing an accuracy of the detected geolocation to obscure the user's actual location. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting geolocation information. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect geolocation information.

For example, reception module 104 may receive, within computing device 202, geolocation security policy 122 that defines an area in which access to geolocation information 124 by applications 270 will be at least partially limited to protect the privacy of a user. Detection module 106 may detect, within computing device 202, a geolocation of computing device 202. Application module 108 may apply, within computing device 202, geolocation security policy 122 to the detected geolocation to determine whether the detected geolocation matches the area in which access to geolocation information 124 by applications 270 will be at least partially limited. Performance module 110 may perform, within computing device 202, a security action to protect the privacy of the user based on determining that the detected geolocation matches the area. The security action may include disabling an action to record the detected geolocation and/or reducing an accuracy of the detected geolocation to obscure the user's actual location. In the example of FIG. 2, system 200 may also include a security service 250 within server 206. Security service 250 may be provided by a third-party security vendor. Security service 250 may store, aggregate, maintain, apply, share, transmit, and/or curate geolocation security policies, as discussed further below.

Computing device 202 generally represents any type or form of computing device capable of reading computer-executable instructions. In some illustrative examples, computing device 202 may include a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that may provide or facilitate security for computing device 202. In some examples, server 206 may correspond to a management server of a security vendor that manages and/or maintains geolocation security policies, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
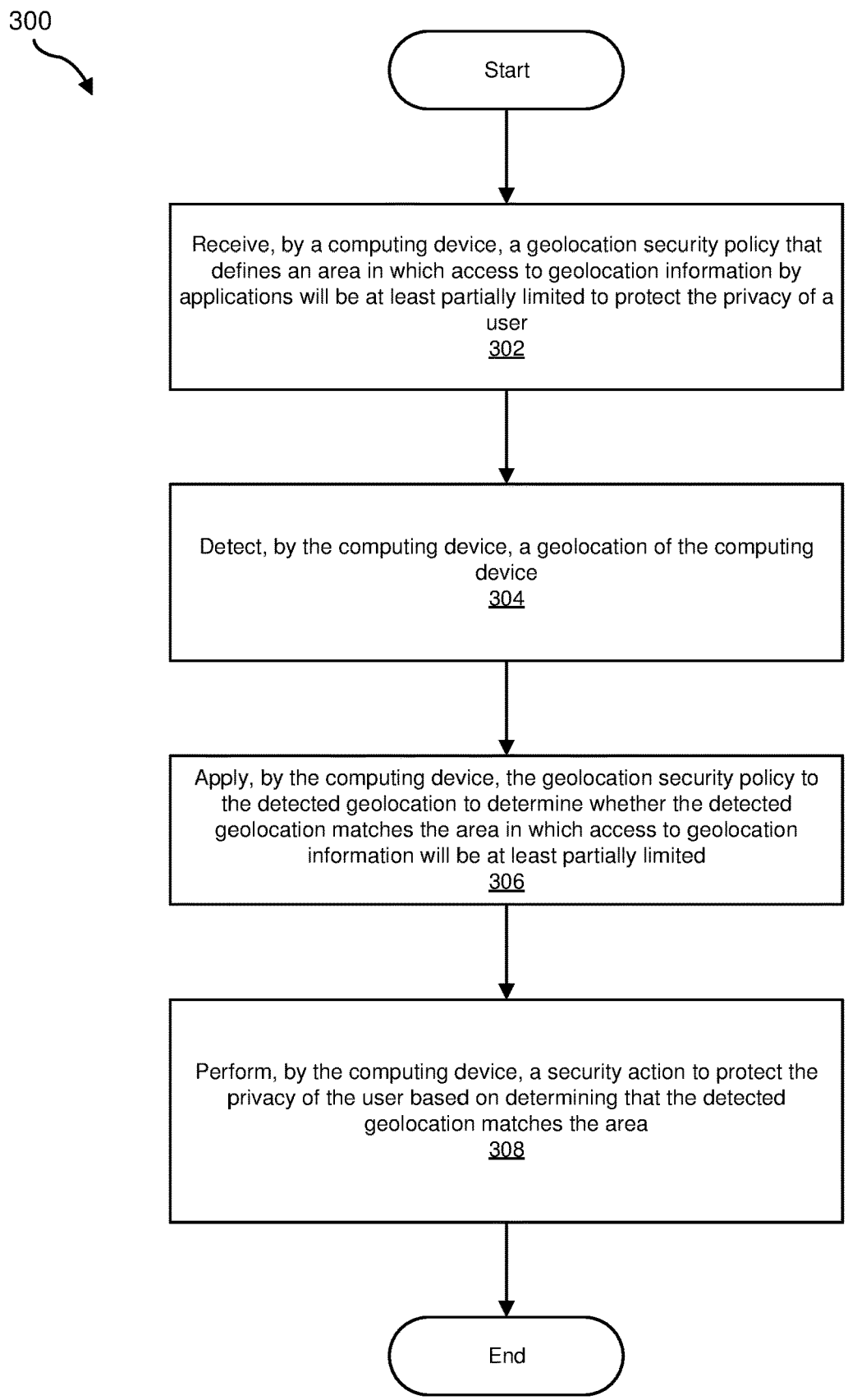
FIG. 3 is a flow diagram of an example method for protecting geolocation information.

FIG. 3 is a flow diagram of an example computer-implemented method 300 for protecting geolocation information. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive a geolocation security policy that defines an area in which access to geolocation information by applications will be at least partially limited to protect the privacy of a user. For example, reception module 104 may, as part of computing device 202 in FIG. 2, receive a geolocation security policy that defines an area in which access to geolocation information 124 by applications 270 will be at least partially limited to protect the privacy of a user.

As used herein, the term "geolocation security policy" generally refers to any set of features, rules, and/or settings that protect one or more items of geolocation information. Furthermore, as used herein, the phrase "access to geolocation information by the applications will be at least partially limited" generally refers to the geolocation security policy specifying at least one security action to be taken to protect, restrict, and/or limit access by one or more applications to geolocation information, at least partially (e.g., by reducing, diminishing, or inhibiting access to the geolocation information, or by reducing accuracy or precision of the geolocation information) or entirely (e.g., by blocking an action to record the geolocation information).

Reception module 104 may receive the geolocation security policy in a variety of ways. In some examples, reception module 104 may receive the geolocation security policy from a security service, such as security service 250, as further discussed above. Security service 250 may remotely manage one or more security features for computing device 202. For example, security service 250 may store, manage, share, transmit, apply, and/or curate one or more geolocation security policies. In more specific examples, security service 250 may push the geolocation security policy to computing device 202, without the user necessarily requesting or approving the application of the geolocation security policy. In other examples, the user may select the geolocation security policy, from a multitude of geolocation security policies, and request transmission of the selected geolocation security policy from the security service.

In additional or alternative examples, reception module 104 may receive the geolocation security policy by receiving user input that specifies the area in which access to geolocation information by the applications will be at least partially limited. For example, the user may access a security application on computing device 202 and manually input data that partially or entirely defines the area in which access to geolocation information by the applications will be at least partially limited. In some examples, the user may manually input data indicating an address and/or geolocation coordinates.

In other examples, reception module 104 may receive the geolocation security policy at least in part by detecting an initial geolocation of the computing device that indicates the area (i.e., the protected area) in which access to geolocation information by the applications will be at least partially limited. Accordingly, in these examples, reception module 104 may identify the area in which access to geolocation information by the applications will be at least partially limited by simply referring to a currently detected geolocation of computing device 202 rather than receiving manual input that specifies an address, coordinates, etc. In a further specific example, reception module 104 may receive the geolocation security policy at least in part by detecting a line of geolocations that indicates a border of the area in which access to geolocation information by the applications will be at least partially limited. For example, the user may walk or drive along a path, and reception module 104 may detect the path and use the detected path to partially or entirely define the protected area.

Additionally or alternatively, reception module 104 may receive the geolocation security policy at least in part by receiving an indication of a radius around the initial geolocation that defines the area in which access to geolocation information by the applications will be at least partially limited. In some examples, the radius may be a default radius. In other examples, the user may enter manual input that specifies the radius or selects the radius from a number of options.

Figure 4:
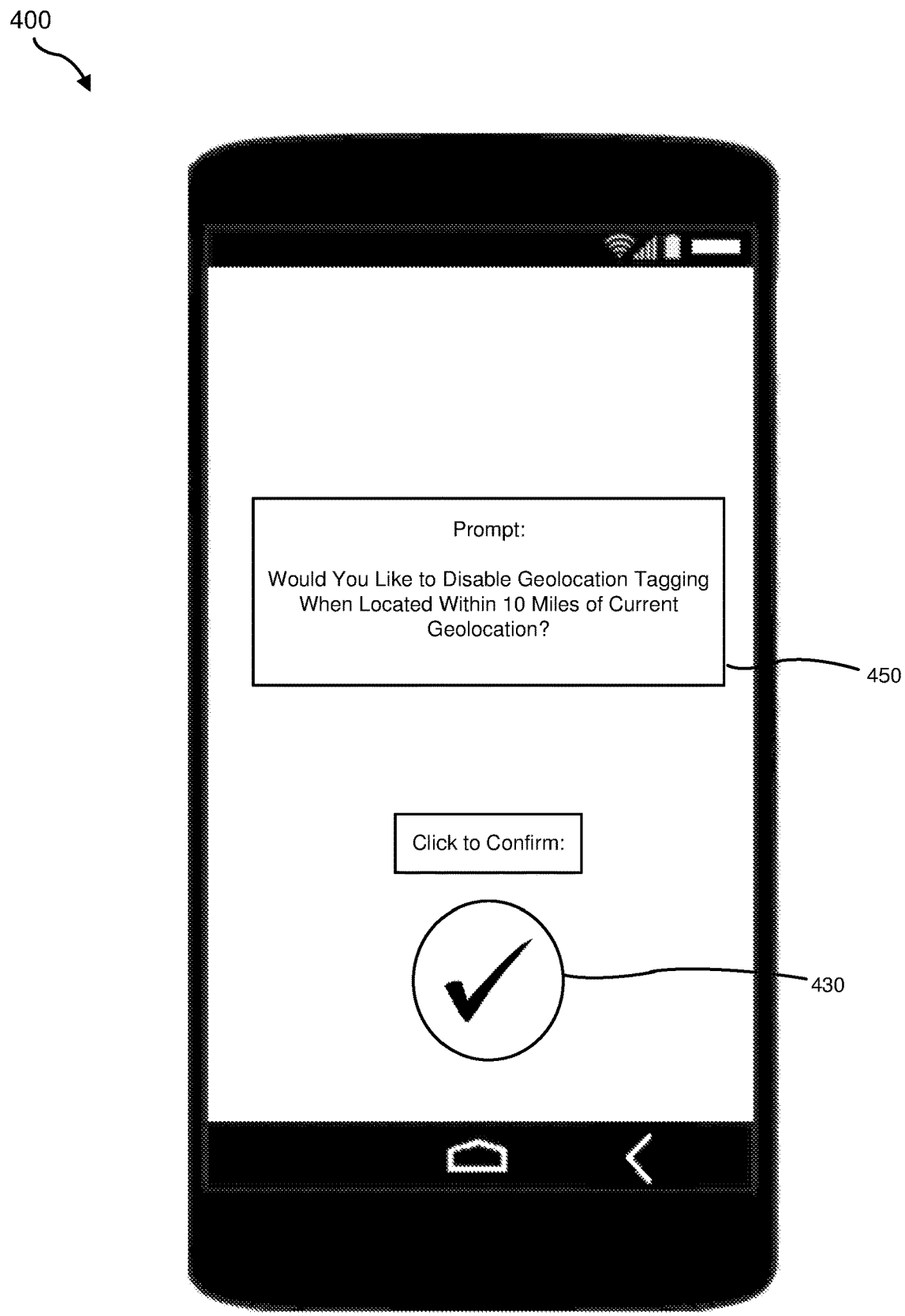
FIG. 4 is a block diagram of an example smartphone display.

FIG. 4 illustrates an example smartphone display 400 that includes a prompt 450 that facilitates reception module 104 receiving the geolocation security policy. As further shown in this figure, prompt 450 asks the user of computing device 202 "Would You Like to Disable Geolocation Tagging When Located Within 10 Miles of The Current Geolocation?" Accordingly, prompt 450 in this example refers to an embodiment in which the user may select or approve a specific radius around a detected initial geolocation to define the protected area. The specific radius may define a particular geographic circle as the area in which access to the geolocation information by the applications will be at least partially limited. The example of a circular shape is merely illustrative. In other examples, reception module 104 may specify any other suitable shape for defining the protected area (e.g., a shape around the initial geolocation), including an ellipse, square, rectangle, etc. FIG. 4 also shows how smartphone display 400 may include a button 430 that enables the user to select, approve, and/or finalize the geolocation security policy corresponding to prompt 450.

At step 304, one or more of the systems described herein may detect a geolocation of the computing device. For example, detection module 106 may, as part of computing device 202 in FIG. 2, detect a geolocation of computing device 202.

Detection module 106 may detect the geolocation of computing device 202 in a variety of ways. In general, detection module 106 may communicate with a global positioning system module, or other location-detection sensor, of computing device 202 to retrieve or reference a detected geolocation.

In some examples, detection module 106 may detect the geolocation of computing device 202 according to a predefined schedule or at a fixed interval. In these examples, detection module 106 may detect the geolocation of computing device 202 automatically without doing so in response to a specific request for the current geolocation of the device by another application. In contrast, in other examples, detection module 106 may detect the geolocation of computing device 202 in response to a specific request from an application.

For example, a content creation application on computing device 202 may request the geolocation of computing device 202. The content creation application may request the geolocation of computing device 202 in response to the capturing or creation of one or more items of content. The capture or creation of the item of content may be performed by a sensor of computing device 202. For example, the content creation application may use a camera and/or microphone to capture a photograph, video, audio, and/or other multimedia recording. In response, the content creation application may request the geolocation of computing device 202 as part of a process for tagging the captured content with geolocation information.

As used herein, the term "geolocation information" generally refers to both information that directly specifies, or indicates, a precise or approximate geographic or other location of computing device 202 and metadata that further describes such information. One illustrative example of the metadata may include the timing of recording the direct geographic location or coordinates. Other illustrative examples of the metadata may include information describing an application, module, hardware, date, and/or user associated with the detecting of the location of computing device 202 (e.g., that directed, facilitated, and/or contributed to the detecting of the location of computing device 202).

At step 306, one or more of the systems described herein may apply the geolocation security policy to the detected geolocation to determine whether the detected geolocation matches the area in which access to geolocation information by the applications will be at least partially limited. For example, application module 108 may, as part of computing device 202 in FIG. 2, apply geolocation security policy 122 to the detected geolocation to determine whether the detected geolocation matches the area in which access to geolocation information by applications 270 will be at least partially limited.

Application module 108 may apply the geolocation security policy in a variety of ways. As used herein, the phrase "matches the area in which access to geolocation information by the applications will be at least partially limited" generally refers to the detected geolocation satisfying a proximity policy indicating whether the detected geolocation is sufficiently near, or within, the protected area to designate a match. In different examples, this proximity policy may check whether the detected geolocation is located within the protected area, overlaps with the protected area, and/or is within a threshold distance of nearness to the protected area. Accordingly, application module 108 may apply the geolocation security policy at least in part by checking whether the detected geolocation satisfies the proximity policy, as discussed above.

Of course, the geolocation security policy may also define a multitude of two or more protected areas where access to geolocation information is at least partially limited. The geolocation security policy may also specify the same or different security actions to take in response to detecting that computing device 202 is located in each of the different protected areas. Moreover, application module 108 may apply the geolocation security policy by checking whether the detected geolocation satisfies the proximity policy with respect to any one of the multiple protected areas.

Additionally, in some examples, detection module 106 may continuously monitor the geolocation of computing device 202. In these examples, application module 108 and/or performance module 110 may automatically and dynamically enable, or disable, a geotagging feature of computing device 202, whenever computing device 202 exits, or enters, a protected area, in accordance with the geolocation security policy. Furthermore, in some examples, the geolocation security policy only specifies that access to the geolocation information by the applications will be at least partially limited by default when computing device 202 is located within the protected area, but the user will still have the option to manually override this default setting.

In the case that the detected geolocation does not satisfy the proximity policy (e.g., is not sufficiently near, or within, the protected area) then performance module 110 may omit the performance of the security action, as discussed further below in connection with step 308, and conventional geotagging may proceed without interruption. Alternatively, in the case that the detected geolocation does satisfy the proximity policy, then performance module 110 may perform the security action, as discussed further below.

At step 308, one or more of the systems described herein may perform a security action to protect the privacy of the user based on determining that the detected geolocation matches the area. For example, performance module 110 may, as part of computing device 202 in FIG. 2, perform a security action to protect the privacy of the user based on determining that the detected geolocation matches the area. The security action may include disabling an action to record the geolocation and/or reducing an accuracy of the geolocation to obscure the user's actual location.

Performance module 110 may perform the security action in a variety of ways. In some examples, the security action may include disabling an action to record the geolocation. For example, performance module 110 may deny a request to provide a geolocation to an application that is attempting to tag one or more items of content, or other data, with the detected geolocation. In related examples, performance module 110 may perform a security action that prevents the application from even requesting the detected geolocation and/or requesting to tag an item of content with the geolocation. In general, performance module 110 may perform any security action that prevents the tagging of an item of content with the detected geolocation. In some specific examples, performance module 110 may perform a security action that prevents the geolocation information from being recorded in an item of memory, such as a file, thread, directory, page, disk, and/or registry. In additional examples, performance module 110 may reverse, strip, and/or delete an item of geolocation information or a geotag that has already been inserted into a file or item of data.

Figure 5:
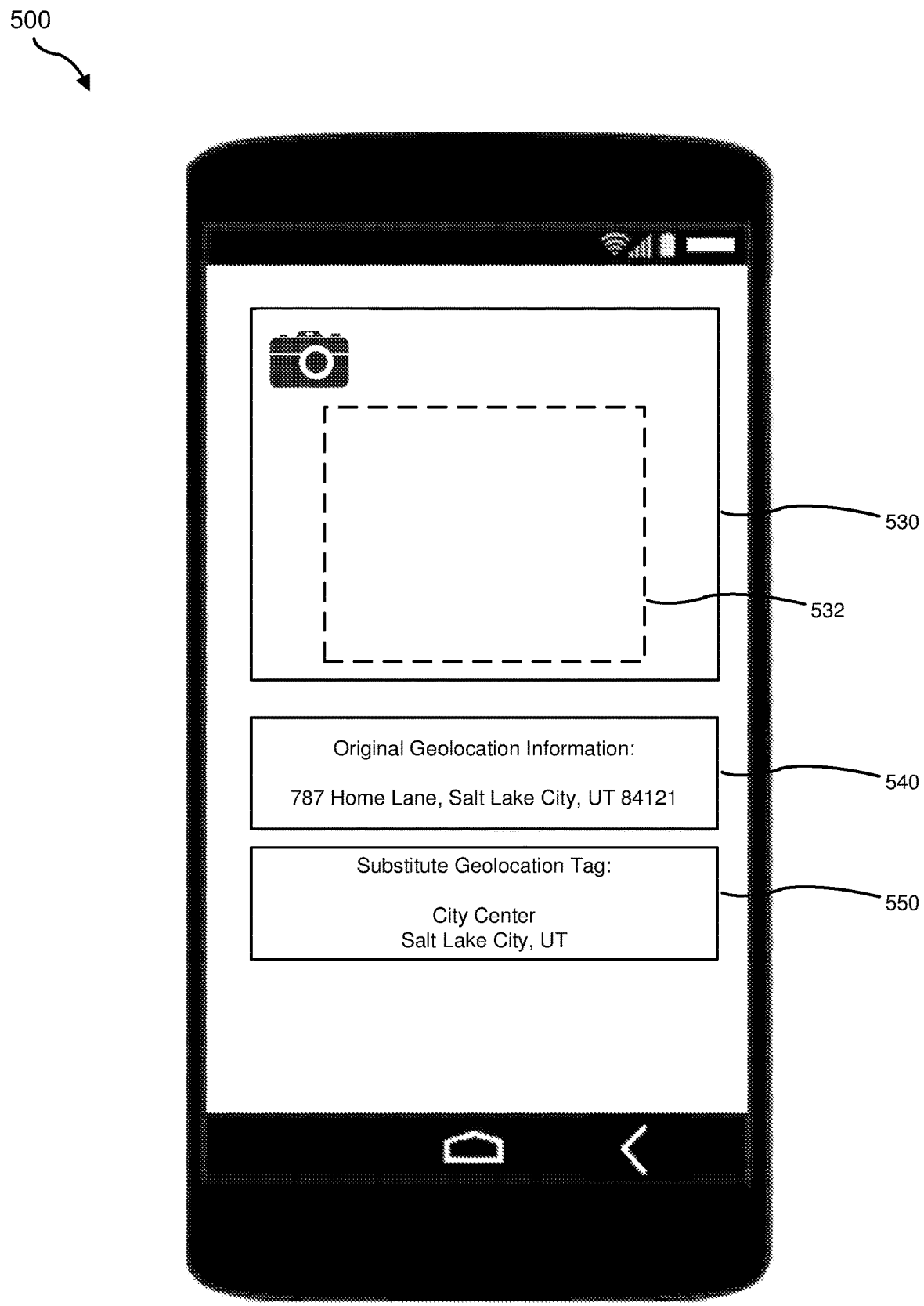
FIG. 5 is a block diagram of another example smartphone display.

Alternatively, performance module 110 may perform the security action by reducing an accuracy of the geolocation to obscure the user's actual location. FIG. 5 shows another example of a smartphone display, in this case smartphone display 500. As further shown in this figure, smartphone display 500 may include a window corresponding to a camera application 530 on computing device 202. Camera application 530 may also optionally display a captured photograph 532 (which is blank in this example).

Smartphone display 500 further illustrates how performance module 110 may perform the security action by reducing an accuracy of the detected geolocation to protect the privacy of the user. Additionally or alternatively, performance module 110 may reduce a precision of the detected geolocation. In this specific example, detection module 106 has detected a geolocation of the specific address, "787 Home Lane, Salt Lake City, Utah 84121." This specific address is indicated to the user within prompt 540 within smartphone display 500. Additionally, smartphone display 500 also includes a prompt 550 that indicates a substitute geolocation tag of "City Center[,] Salt Lake City, Utah" In this example, performance module 110 may display one or both of these prompts to the user to inform the user about the reduction of accuracy of the detected geolocation to protect the user's privacy. In other examples, performance module 110 may perform the substitution, or reduction of accuracy, without graphically prompting the user (e.g., automatically and/or invisibly).

FIG. 5 further illustrates how performance module 110 may substitute a less accurate geolocation for a more accurate and originally detected geolocation to protect the user's privacy. In this example, the original geolocation and the substitute geolocation are defined in terms of an address, but in other examples one or both of these may be defined in terms of geolocation coordinates. Moreover, this figure further illustrates how the substitute geolocation may omit one or more items of information, such as a zip code. Additionally, this figure also illustrates how performance module 110 may select a substitute geolocation from a list of monuments, notable locations, and/or predefined locations. In this specific example, the user of computing device 202 may have specified that a radius around the user's home, "787 Home Lane, Salt Lake City, Utah 84121," is a protected area in which access to geolocation information by the applications will be at least partially limited. Accordingly, when detection module 106 detects that the user is located at the user's home, performance module 110 may reduce the accuracy or precision of the detected geolocation by selecting from the list another location that is near, nearest, and/or proximate to the user's home. In this case, the user's home is proximate to the center of the metropolis of Salt Lake City. In this manner, performance module 110 may "fuzz," spread, obscure, and/or distort the originally detected geolocation to protect the user's privacy. In this embodiment, performance module 110 may perform a security action that forms a compromise solution by both providing some information about the user's current geolocation (e.g., the nearby metropolis) while also restricting access to more accurate or precise information about the user's current geolocation (e.g., the user's precise address and/or home address). Additionally or alternatively, performance module 110 may also reduce the accuracy or precision of metadata relating to the directly detected geolocation (e.g., metadata describing who or what performed the geolocation detection and/or when the geolocation detection occurred), as further discussed above.

As discussed above, the disclosed systems and methods may improve upon related techniques for protecting geolocation information. Specifically, the disclosed systems and methods may improve the granularity and/or intelligence of systems that protect geolocation information. Accordingly, the disclosed systems and methods may dynamically protect geolocation information based upon one or more factors, including a current or detected geolocation of the computing device. The disclosed systems and methods may thereby enable the user to selectively and automatically share, or protect, geolocation information without forcing the user to enable, or disable, geolocation tagging on a global basis.

Figure 6:
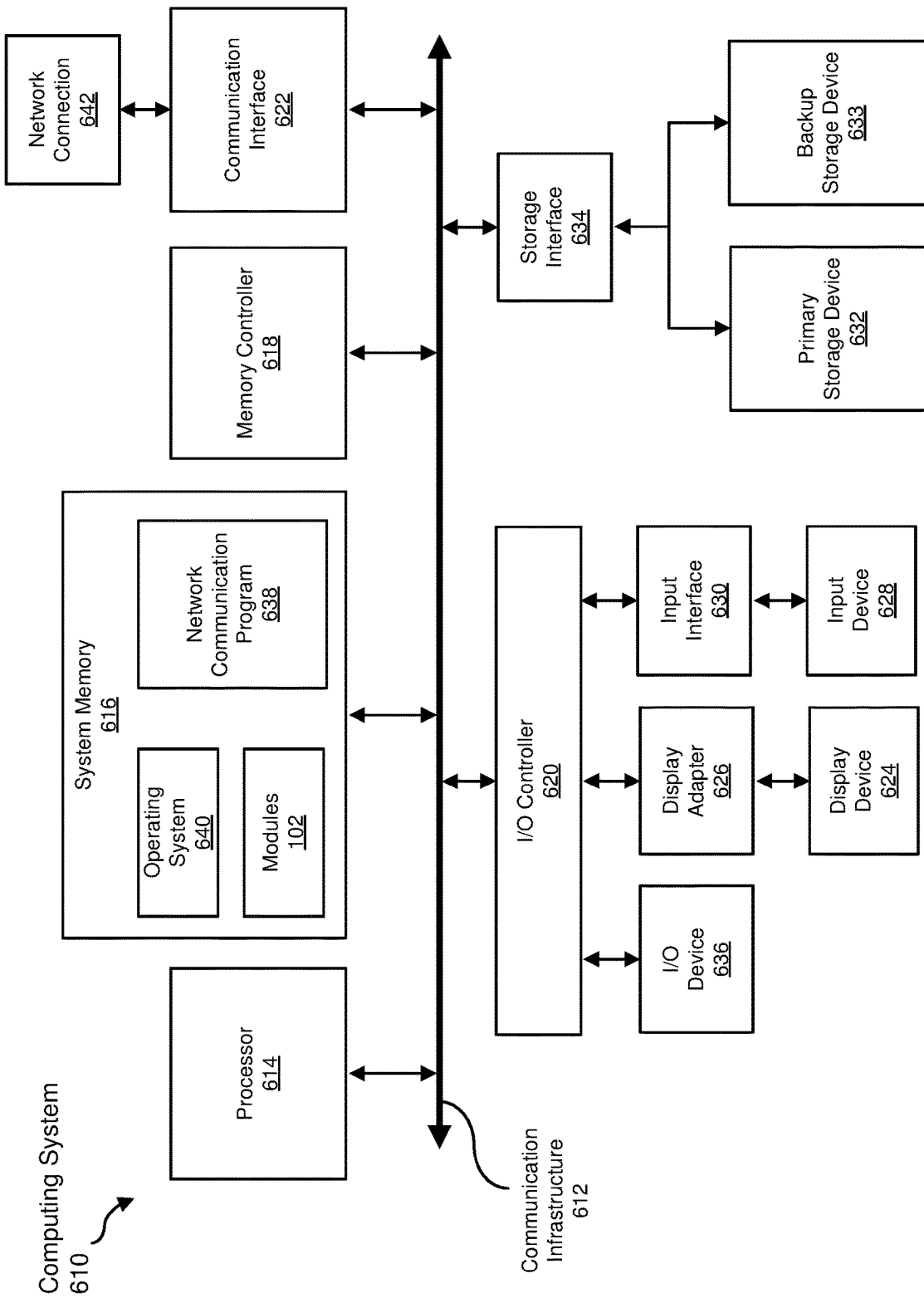
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
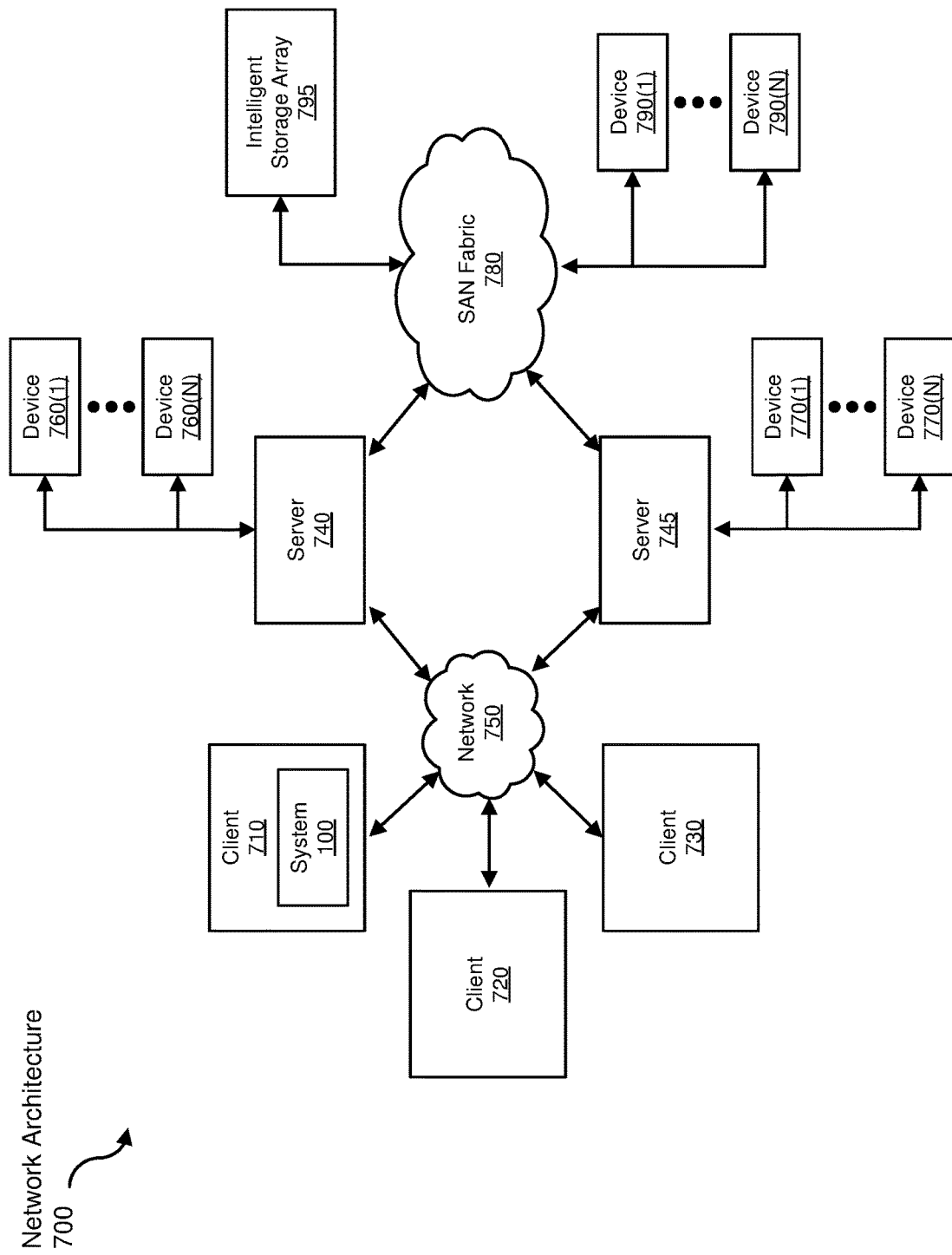
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting geolocation information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may transform a geolocation by reducing an accuracy or precision of the geolocation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting geolocation information, at least a portion of the method being performed by a computing device comprising at least one processor, the method comprising:
    receiving, by the computing device, a geolocation security policy that defines an area in which access to geolocation information by applications will be at least partially limited to protect the privacy of a user;
    detecting, by the computing device, a geolocation of the computing device;
    applying, by the computing device, the geolocation security policy to the detected geolocation to determine whether the detected geolocation matches the area in which access to geolocation information by the applications will be at least partially limited; and
    performing, by the computing device, a security action to protect the privacy of the user based on determining that the detected geolocation matches the area, the security action comprising disabling a geotagging feature that geotags at least one photo captured by a camera of the computing device with the geolocation of the computing device;
    wherein the geolocation security policy specifies that access to the geolocation information by the applications will be at least partially limited as a default setting when the computing device is located within the area but the user still has an option to manually override the default setting.

2. The computer-implemented method of claim 1, wherein receiving the geolocation security policy comprises receiving user input that specifies the area in which access to geolocation information by the applications will be at least partially limited.

3. The computer-implemented method of claim 2, wherein receiving user input that specifies the area in which access to geolocation information by the applications will be at least partially limited comprises receiving user input indicating at least one of:
    an address; and
    geolocation coordinates.

4. The computer-implemented method of claim 1, wherein receiving the geolocation security policy comprises detecting an initial geolocation of the computing device that indicates the area in which access to geolocation information by the applications will be at least partially limited.

5. The computer-implemented method of claim 4, wherein detecting the initial geolocation of the computing device comprises detecting a line of geolocations that indicates a border of the area in which access to geolocation information by the applications will be at least partially limited.

6. The computer-implemented method of claim 4, wherein receiving the geolocation security policy comprises receiving an indication of a radius around the initial geolocation that defines the area in which access to geolocation information by the applications will be at least partially limited.

7. The computer-implemented method of claim 1, wherein the security action comprises disabling an action to record the detected geolocation.

8. The computer-implemented method of claim 1, wherein a video captured by the camera comprises the photo.

9. The computer-implemented method of claim 8, wherein the video was captured using both a microphone and the camera to record video content.

10. The computer-implemented method of claim 9, wherein the geolocation security policy is received from a security service.

11. A system for protecting geolocation information, the system comprising:
- a reception module, stored in memory of a computing device, that receives a geolocation security policy that defines an area in which access to geolocation information by applications will be at least partially limited to protect the privacy of a user;
- a detection module, stored in memory of the computing device, that detects a geolocation of the computing device;
- an application module, stored in memory of the computing device, that applies the geolocation security policy to the detected geolocation to determine whether the detected geolocation matches the area in which access to geolocation information by the applications will be at least partially limited;
- a performance module, stored in memory of the computing device, that performs a security action to protect the privacy of the user based on determining that the detected geolocation matches the area, the security action disabling a geotagging feature that geotags at least one photo captured by a camera of the computing device with the geolocation of the computing device; and
- at least one physical processor configured to execute the reception module, the detection module, the application module, and the performance module;
- wherein the geolocation security policy specifies that access to the geolocation information by the applications will be at least partially limited as a default setting when the computing device is located within the area but the user still has an option to manually override the default setting.

12. The system of claim 11, wherein the reception module receives the geolocation security policy by receiving user input that specifies the area in which access to geolocation information by the applications will be at least partially limited.

13. The system of claim 12, wherein the reception module receives user input that specifies the area in which access to geolocation information by the applications will be at least partially limited by receiving user input indicating at least one of:
- an address; and
- geolocation coordinates.

14. The system of claim 11, wherein the reception module receives the geolocation security policy by detecting an initial geolocation of the computing device that indicates the area in which access to geolocation information by the applications will be at least partially limited.

15. The system of claim 14, wherein the reception module detects the initial geolocation of the computing device by detecting a line of geolocations that indicates a border of the area in which access to geolocation information by the applications will be at least partially limited.

16. The system of claim 14, wherein the reception module receives the geolocation security policy by receiving an indication of a radius around the initial geolocation that defines the area in which access to geolocation information by the applications will be at least partially limited.

17. The system of claim 11, wherein the security action comprises disabling an action to record the detected geolocation.

18. The system of claim 11, wherein a video captured by the camera comprises the photo.

19. The system of claim 18, wherein the video was captured using both a microphone and the camera to record video content.

20. A non-transitory computer-readable medium comprising one or more computer-readable instructions that, when executed by at least one processor of a computing device, cause the computing device to:
- receive a geolocation security policy that defines an area in which access to geolocation information by applications will be at least partially limited to protect the privacy of a user;
- detect a geolocation of the computing device;
- apply the geolocation security policy to the detected geolocation to determine whether the detected geolocation matches the area in which access to geolocation information by the applications will be at least partially limited; and
- perform a security action to protect the privacy of the user based on determining that the detected geolocation matches the area, the security action comprising disabling a geotagging feature that geotags at least one photo captured by a camera of the computing device with the geolocation of the computing device;
- wherein the geolocation security policy specifies that access to the geolocation information by the applications will be at least partially limited as a default setting when the computing device is located within the area but the user still has an option to manually override the default setting.

* * * * *